June 23, 1942.  C. G. SENSENICH  2,287,575
CAR AXLE MOUNTING
Filed April 25, 1941  2 Sheets-Sheet 1

INVENTOR
Chester G. Sensenich
by his attorneys
Stebbins and Blenko

June 23, 1942.  C. G. SENSENICH  2,287,575
CAR AXLE MOUNTING
Filed April 25, 1941  2 Sheets-Sheet 2

INVENTOR
Chester G. Sensenich
by his attorneys
Stebbins and Blenko

Patented June 23, 1942

2,287,575

UNITED STATES PATENT OFFICE 2,287,575

CAR AXLE MOUNTING

Chester G. Sensenich, Irwin, Pa., assignor to Irwin Foundry & Mine Car Company, Irwin, Pa., a corporation of Pennsylvania Application April 25, 1941, Serial No. 390,308

4 Claims. (Cl. 105—224.1)

This invention relates to a mounting for the axles of a wheeled car and, in particular, a rail car of relatively small size, of the type generally known as mine cars.

Mine cars must be designed with a view to minimum height and low overall weight in order to provide as high a load carrying capacity as possible, and must also be capable of manufacture at a cost which will permit a relatively low selling price. At the same time, mine cars are subjected to exceedingly severe service conditions and are not likely to receive very careful maintenance. Mine cars as known heretofore have satisfied the several requirements indicated in varying degrees, and it is an object of my invention to improve generally upon known car constructions by overcoming the objectionable features characteristic of those with which I am familiar.

I have invented a novel car construction specially adapted for mine cars, which particularly concerns the mounting of the axles on the car body. By my invention, I provide a cushioned axle mounting which is relatively inexpensive and does not involve any increase in the overall height of the car as compared to present practice. This wheel mounting protects the car body from the shocks to which the wheels are subjected and, at the same time, continuously urges the wheels individually toward the track rails to maintain them in contact therewith despite irregularities in the track surface. In a preferred embodiment of the invention, I provide a pair of resilient blocks or pads at each end of each axle, one pad being on either side of the axle. Sheathing plates on opposite sides of each pad are secured to the car body and engage the axle, respectively, so that the weight of the car and contents is transmitted to the axle through the resilient pads, the opposite surfaces of which are thereby displaced relative to each other. I may also provide cushion blocks between the axles and car bottom.

The invention is applicable to cars of the through axle type whether of the drop bottom construction, in which the axles are above the car bottom or of the more conventional construction in which the axles are below the car bottom. In the former case, I provide axle housings extending from one side of the car to the other, entirely enclosing the axles. In the latter case, I employ axle boxes at each end of the axles, having a section similar to that of the axle housing. The invention is also applicable to cars provided with so-called "stub" axles.

Further novel features and advantages of the invention will become apparent during the following detailed description which refers to the accompanying drawings illustrating two forms of the preferred embodiment above mentioned. In the drawings.

Figure 1:
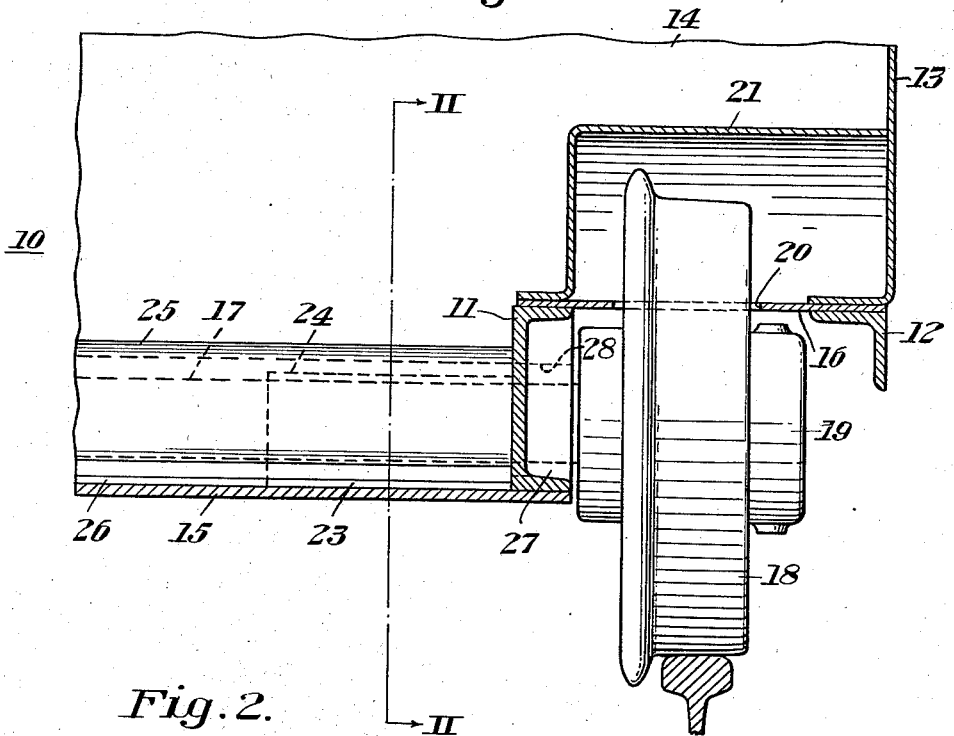
Figure 1 is a partial transverse section through a car having the invention embodied therein.
Figure 2:
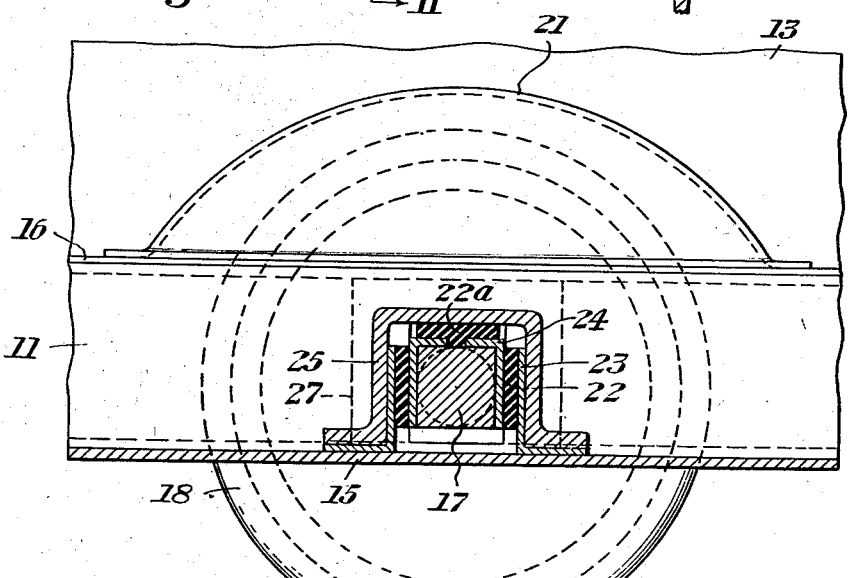
Figure 2 is a partial section taken along the line II—II of Figure 1.

Referring now in detail to the drawings and, for the present, to Figures 1 and 2, a mine car 10 is composed of longitudinal channels 11 and angles 12 which, with suitable cross members adjacent the ends of the car, support side walls 13, end walls 14 and a bottom plate 15 defining the car body. Side extensions 16 of the bottom plate 15 are carried on the channels 11 and angles 12.

Axles 17 extend transversely of the body near each end thereof. The axles are preferably square in section, as shown in Figure 2, except for journal portions on the ends thereof adapted to receive wheels 18 having anti-friction bearing assemblies 19 embodied therein. The extensions 16 have holes 20 therein adapted to receive the upper portions of the wheels 18. Wheel hoods 21 overlie the wheels and extend from the inner edge of the extensions 16 to the adjacent side wall 13.

The load of the car and contents is transmitted from the car body to the axles 17 through resilient pads or blocks 22. One of these blocks is disposed on each side of each axle, adjacent each end thereof. The blocks are preferably of rubber and have angle brackets or hanger plates 23 and 24 bonded to opposite sides thereof. Preferably the rubber of which the blocks 22 are composed is vulcanized to the vertical flanges of the brackets 23 and 24 to provide a permanent bond therewith. The horizontal flanges of the brackets 23 are disposed flat on the car bottom 15 and are secured thereto in any convenient manner. The horizontal flanges of the brackets 24 partially overlie the top of the axles 17.

Axle housings 25 are disposed over the axles and extend between the channels 11. The housings 24 are secured to the car bottom by rivets (not shown). Filler strips 26 are laid under the flanges of the axle housings between the inner ends of the brackets 23. Bumper blocks 22a of rubber or the like are disposed between the horizontal flanges of brackets 24 and the housings 25, to cushion and limit downward movement of the body after the pads 22 have been loaded to the fully stressed condition illustrated.

Guide and bearing blocks 27 are secured between the flanges of the channels 11. The blocks 27 and the webs of the channels 11 are recessed as at 28 to permit limited vertical movement of the car body relative to the axle.

It will be understood from the foregoing description that the weight of the car and its contents is normally transmitted to the axles solely through the pads 22. This load tends to displace the opposite faces of the pads from their normal offset positions relative to each other, until the strength of the pads in resistance to shearing stress is equivalent to the load imposed thereon and the opposite faces of the pads are substantially alined, as shown. By virtue of this construction the impact blows received by the car wheels as they traverse the track rails, whether horizontal or vertical, are cushioned instead of being transmitted directly to the car body. At the same time, each wheel is constantly urged against the track rail by the tendency of the rubber pads 22 to return to their normal unstressed condition, and the mounting of my invention permits downward movement of any wheel individually on passing a low spot in the surface of the rail, thereby tending to maintain proper engagement of the wheels with the rails at all times, despite irregularities therein. It will also be noted that the pads 22, since they are disposed alongside the axles and have about the same vertical dimension as the latter, do not require any increase in the overall height of the car for a given capacity of the body.

Figure 3:
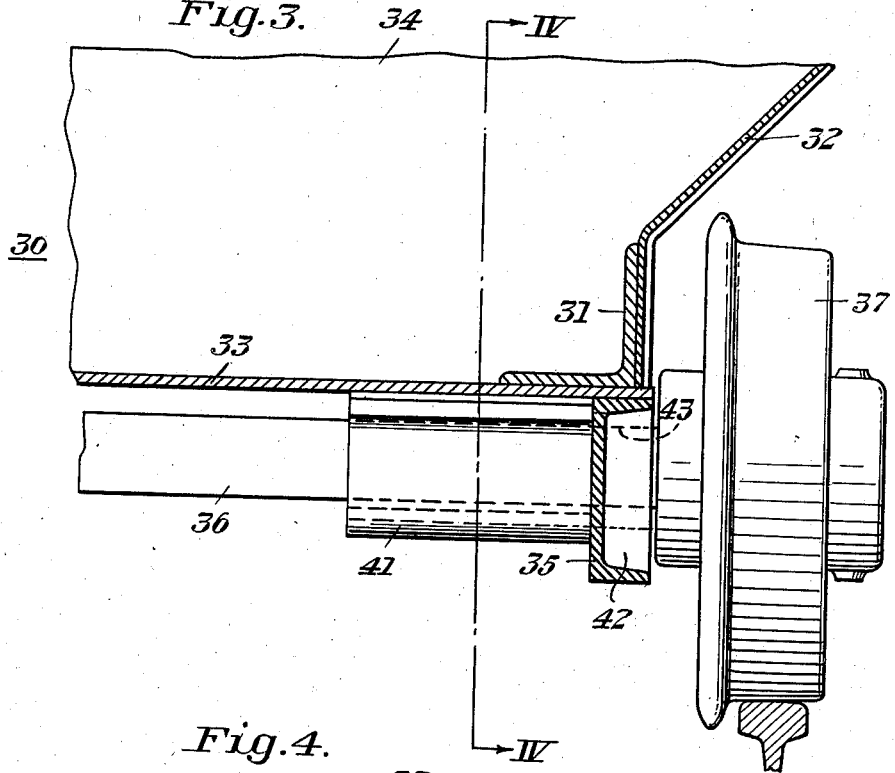
Figure 3 is a view similar to Figure 1 showing the invention embodied in a different form of car.
Figure 4:
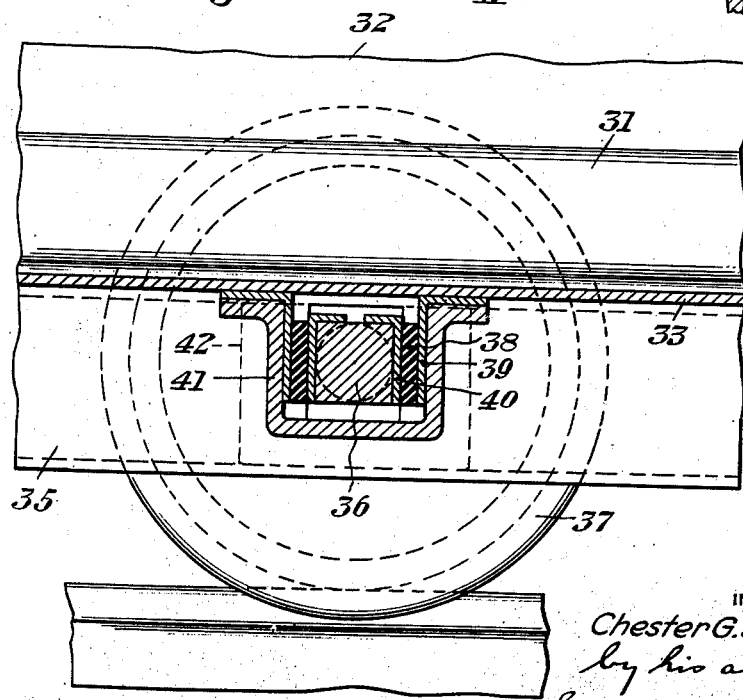
Figure 4 is a partial section along the line IV—IV of Figure 3.

The mounting of my invention, in addition to being applicable to cars of the drop bottom construction, as shown in Figures 1 and 2, may also be incorporated in cars of more conventional construction in which the axles are below the car bottom. Referring to Figures 3 and 4, a car 30 has longitudinal angles 31 to which side walls 32 and a bottom plate 33 are secured. The car body is completed by end walls 34 secured to the side walls and suitable cross members at the ends of the car. The car body is supported on longitudinal channels 35.

Axles 36 extending transversely of the car body adjacent the ends thereof have wheels 37 mounted thereon in the same manner as the wheels 18 are carried on axles 17. Resilient pads 38, preferably of rubber, have angle brackets or hanger plates 39 and 40, bonded to opposite sides thereof, the pads being arranged in pairs, one on each side of the axles at each end thereof. The brackets 39 and 40 correspond generally to the brackets 23 and 24, with slight modifications. The brackets 39 have their horizontal flanges secured to the car bottom, while the horizontal flanges of the brackets 40 extend partly over the top of the axles. Axle boxes or shackles 41 composed of short lengths of a section similar to that forming the housings 25, are secured to the car bottom adjacent the channels 35 and enclose the axle mountings.

Guide and bearing blocks 42 positioned between the flanges of the channels 35 serve the same purpose as the blocks 27 and are recessed as at 43 to permit downward movement of the body relative to the axles.

It will be understood that the construction illustrated in Figures 3 and 4 operates in the same manner as that shown in Figures 1 and 2, to cushion the shocks to which the wheels are subjected and to urge the wheels constantly against the track rails. The construction of Figures 3 and 4, furthermore, like that shown in Figures 1 and 2, requires no material increase in the overall height of the car compared to constructions in which the axles are rigidly secured to the car bottom.

The invention may be applied to cars with stub axles merely by using one of the mountings shown, on each end of such axles.

It will be apparent that the invention provides a car axle mounting of great simplicity and relatively low cost, which has important advantages over axle mountings as proposed heretofore for mine cars or the like. Several of these advantages have already been mentioned. In addition, the axle mounting of my invention requires no maintenance or adjustment but is always in condition for use. There are no wearing parts, furthermore, and the cushioning pads may easily be replaced should they eventually lose some of their resilience.

Although I have illustrated but a preferred embodiment and modification of the invention, it will be understood that changes in the construction and arrangement of parts shown in the drawings may be made without departing from the spirit of the invention or the scope of the appended claims.

I claim:

1. Means for mounting a square axle on a car bottom comprising a pair of pads of yieldable material extending along opposite sides of the axle near the ends thereof, plates bonded to the inner faces of said pads having flanges extending inwardly above said axle and bearing thereon, and plates bonded to the outer faces of said pads having flanges secured to said car bottom.

2. Means for mounting a square axle on a car bottom comprising a pair of pads of yieldable material having a length several times their width and a substantial thickness, extending along opposite sides of the axle near the ends thereof, hangers bonded to the inner faces of said pads having flanges extending inwardly above said axle and bearing thereon, and hangers bonded to the outer faces of said pads and secured to said car bottom.

3. Means for mounting a square axle on a car bottom comprising a pair of substantially flat, elongated rubber pads disposed along the axle on opposite sides thereof near the ends, inner angle brackets bonded to the inner faces of the pads having flanges overhanging the axle, and outer angle brackets bonded to the outer faces of said pads having flanges secured to the car bottom.

4. Means for mounting a square axle on a car bottom comprising rubber blocks disposed on opposite sides of the axle adjacent each end thereof, and angle brackets bonded to opposite faces of said blocks, certain of said brackets having portions extending over and bearing on the axle, the other brackets being secured to the car bottom.

CHESTER G. SENSENICH.